June 30, 1936.    J. A. HIRTZ, SR    2,045,853
MULTIPLE TOOL WOODWORKING MACHINE
Filed March 13, 1935    5 Sheets-Sheet 1

INVENTOR.
Joseph A. Hirtz Sr.
BY
ATTORNEY.

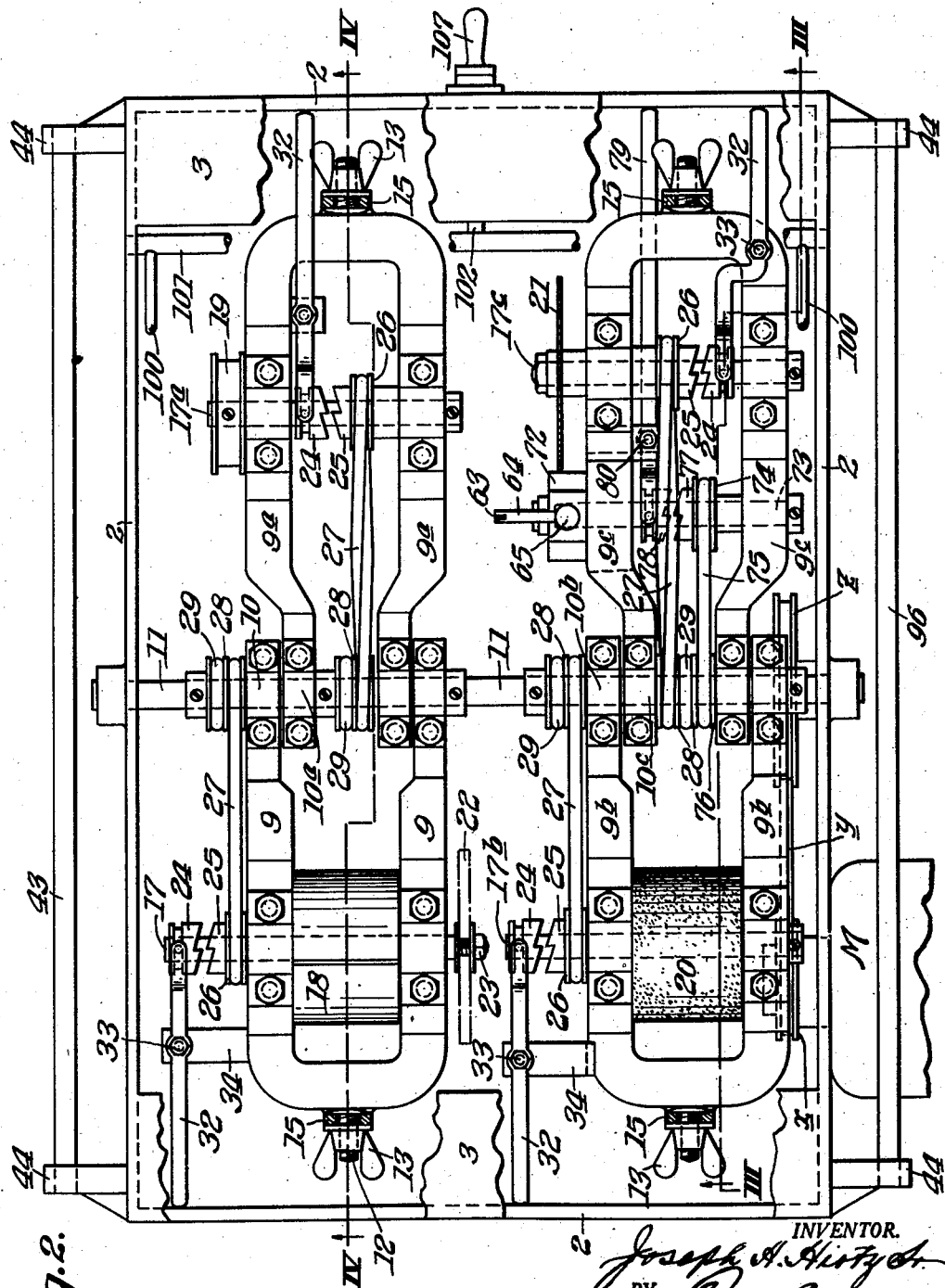

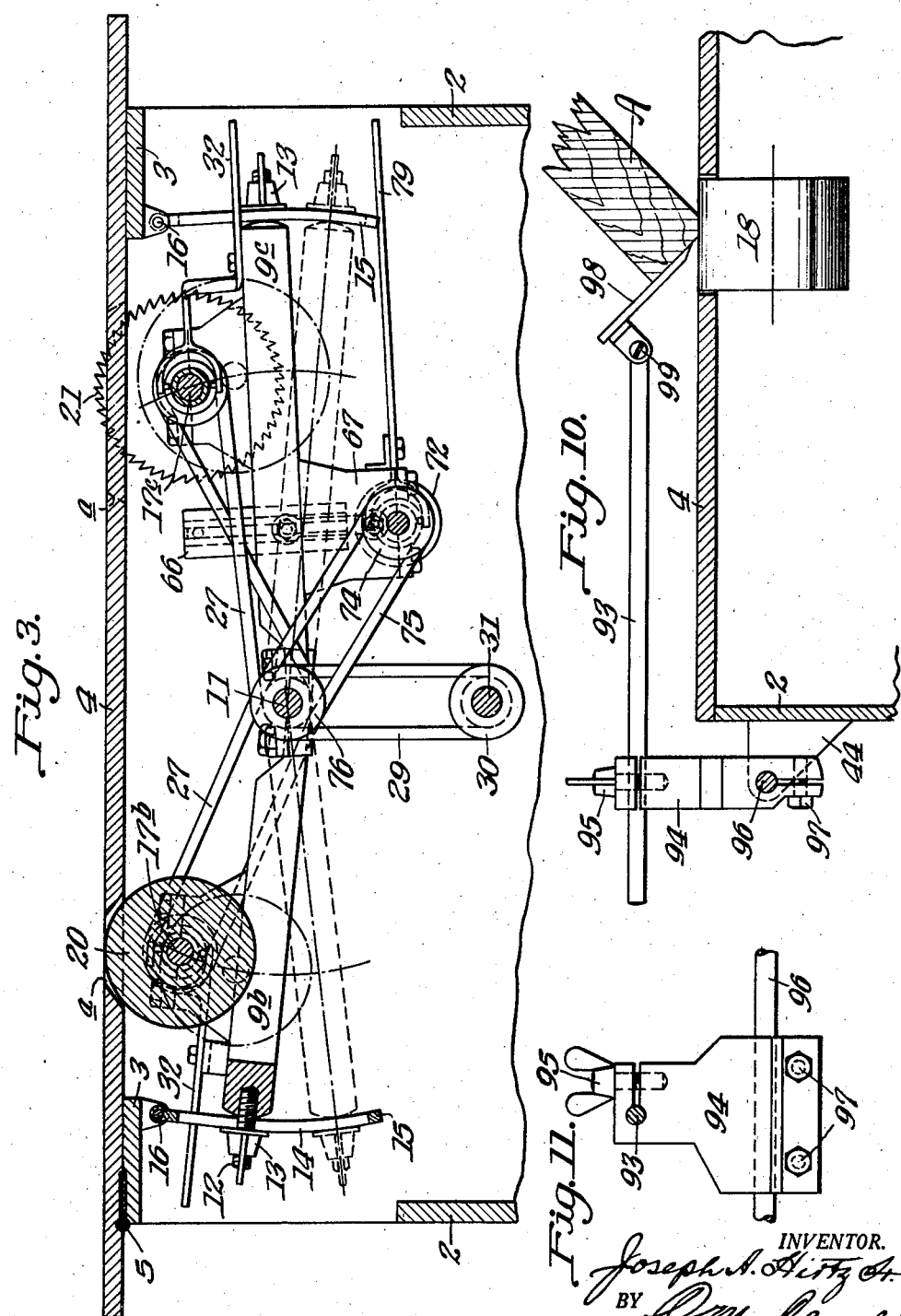

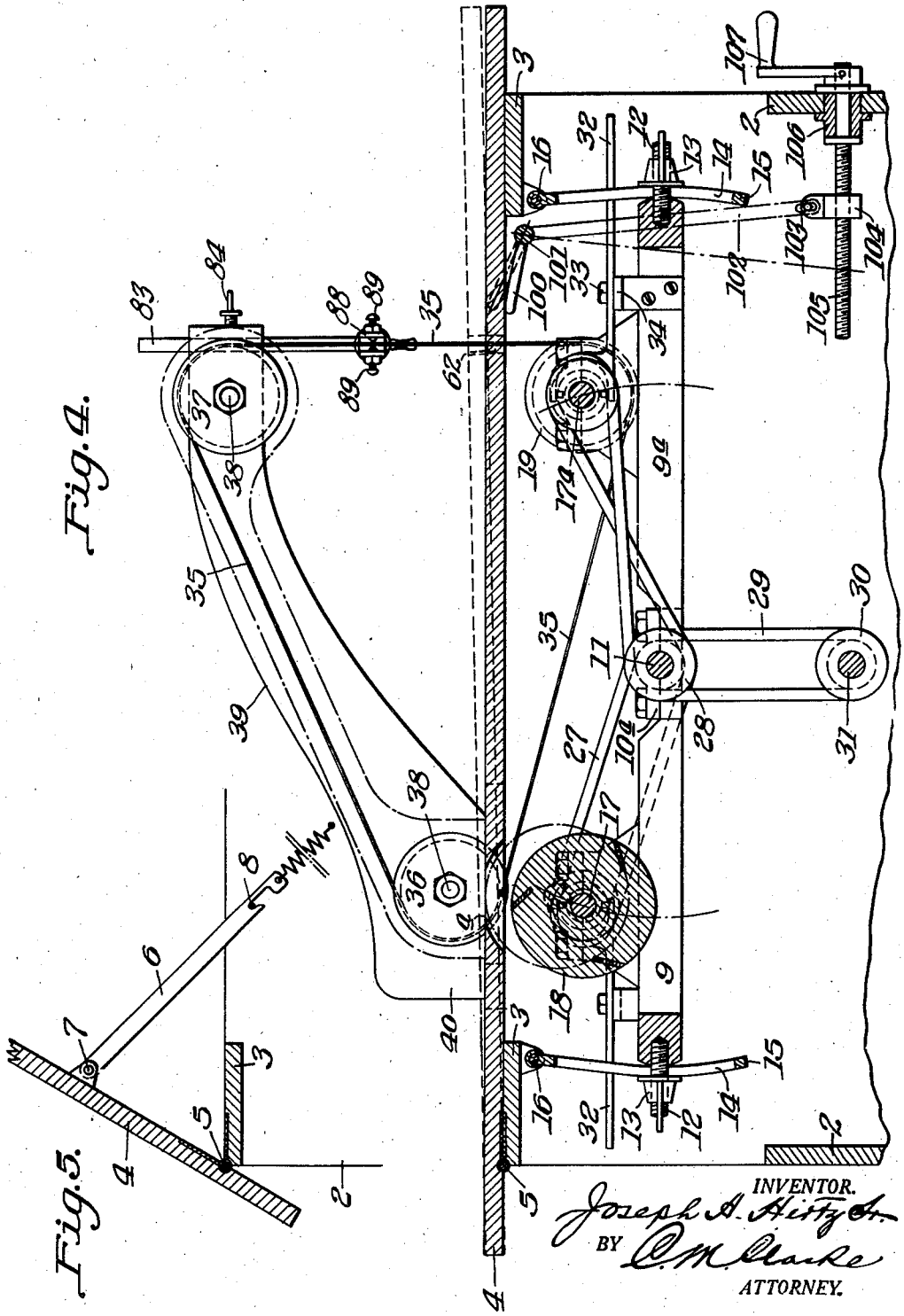

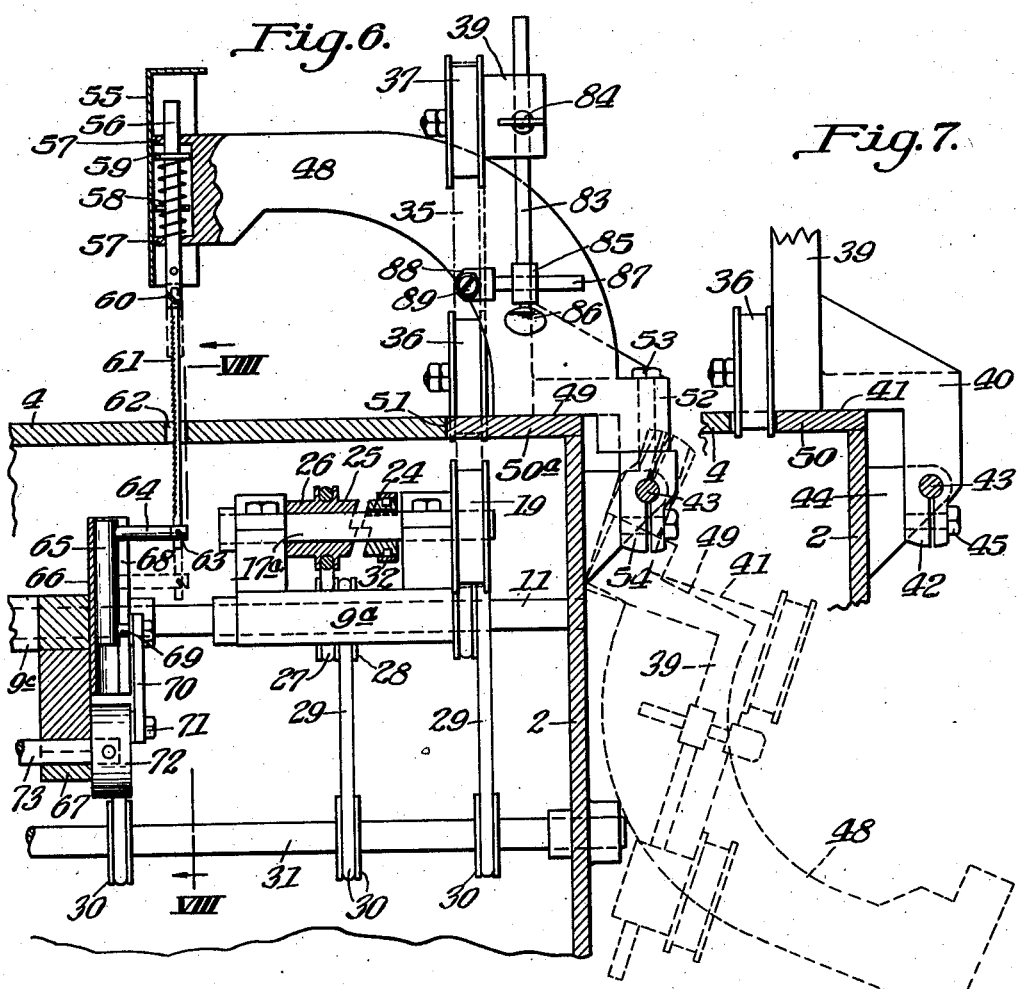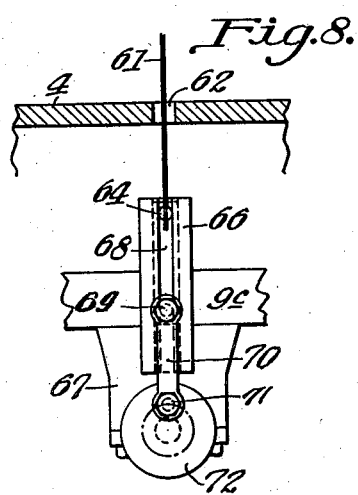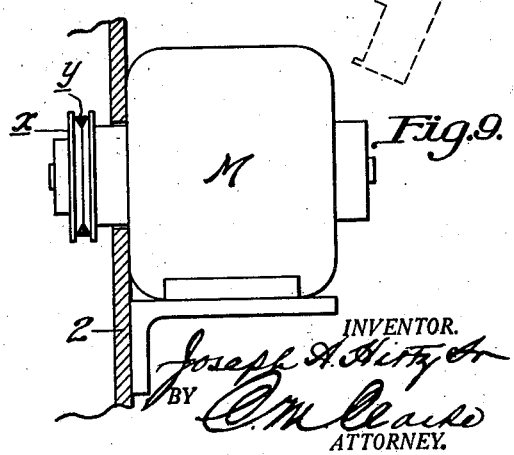

Patented June 30, 1936

2,045,853

UNITED STATES PATENT OFFICE 2,045,853

MULTIPLE TOOL WOOD WORKING MACHINE

Joseph A. Hirtz, Sr., Mount Oliver, Pa., assignor of one-half to Ellsworth J. Smith, Sr., Mount Oliver, Pa.

Application March 13, 1935, Serial No. 10,827

7 Claims. (Cl. 144—1)

My invention consists of a multiple tool woodworking machine adapted to perform a plurality of operations by means of individual tool units, individually driven and individually adjustable, as hereinafter described. The machine as a whole comprises a suitable supporting frame provided with a cover top or table, preferably adjustable to varying inclination, and capable of being elevated to inoperative position for access to the interior. The several actuating tool units are so mounted as to be capable of adjustment toward or from the operating plane of the table top and to be actuated through driving connections with a prime mover, with suitable clutch mechanism and various co-operating and other elements, as hereinafter described.

In its preferred construction the machine comprises a planer, a miller, a sand papering wheel, a circular saw, a jig saw, a band saw, an adjustable frame for each and a supporting mounting therefor, an adjustable guide and its mounting, means for adjustment of each of said individual units, means for adjusting the table top, clutch actuating means, and various other elements contributing to the desired movements and operations, as illustrated in the drawings and as herein described.

Referring to the drawings:

Fig. 2 is a similar view with the top and certain exterior working portions removed, and portions of the frame broken away, showing the interior operative mechanism;

Fig. 3 is a partial longitudinal vertical section on the line III—III of Fig. 2, showing the circular saw elevated for operation;

Fig. 4 is a similar view on the line IV—IV of Fig. 2, showing the band saw in position for operation, with the planer depressed;

Fig. 5 is a detail view of the tilting support for the cover plate;

Fig. 6 is a cross section on the line VI—VI of Fig. 1, showing the jig saw mechanism in operative position;

Fig. 7 is a detail sectional view showing the tilting support mounting of the base of the band saw frame or arm;

Fig. 8 is a sectional view on the line VIII—VIII of Fig. 6, showing the jig saw actuating mechanism;

Fig. 9 is a detail sectional view showing the prime mover connected with the main shaft;

Fig. 10 is a transverse section on the line X—X of Fig. 1, but showing a modified guide construction;

Fig. 11 is a face view of the tilting supporting block for the guide stem.

Figure 1:
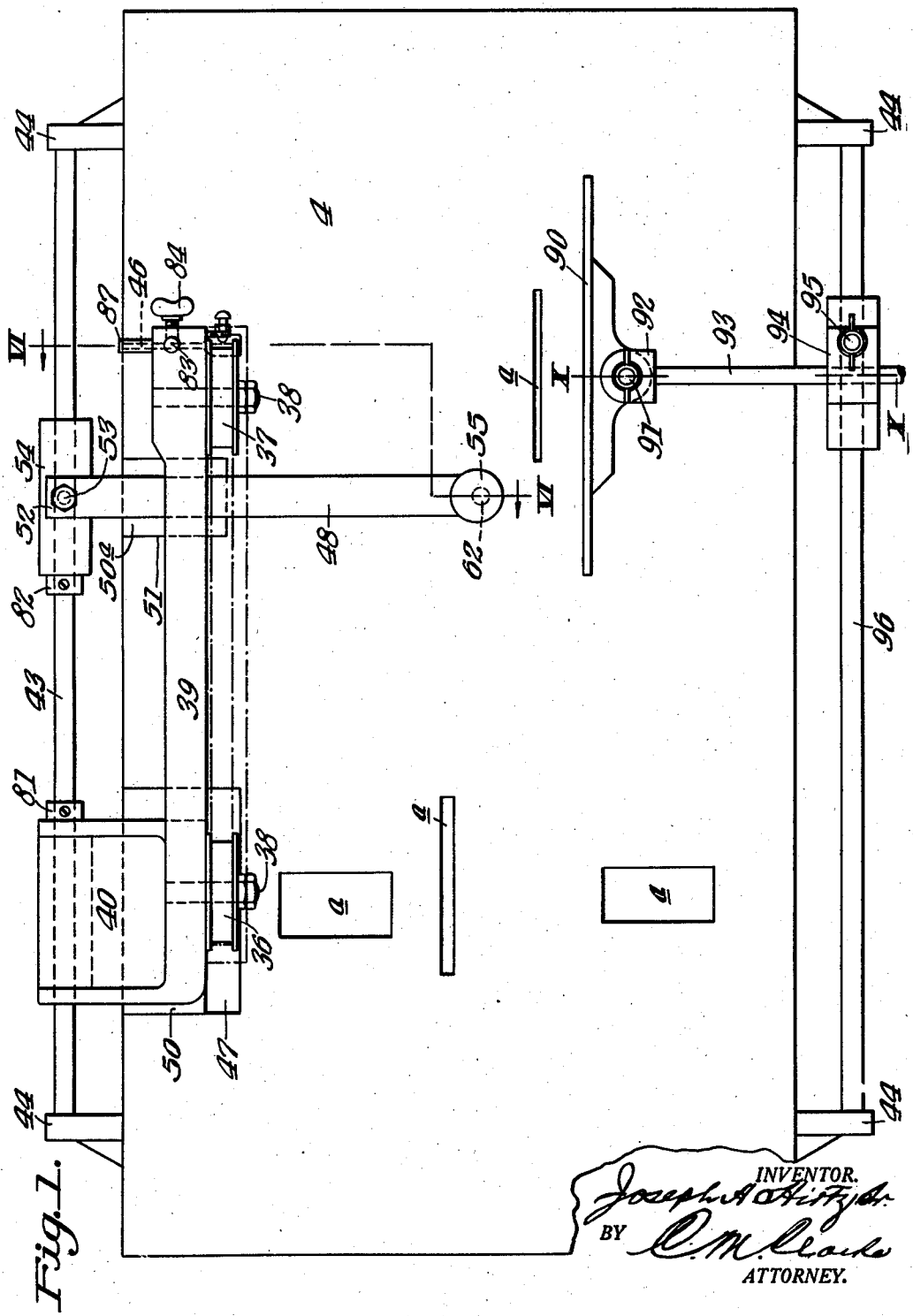
Fig. 1 is a general plan view of the machine showing the jig and band saw elements and one of the guides in position on the table top.

Referring to the drawings, the supporting framework 2 is generally rectangular, having side and end walls and a suitable mounting base for rigid placement. The frame is preferably made of a single casting and having at its upper portion flat supporting side edges and end bearing members 3 for the adjustable table 4. The latter is hinged to one end portion of the frame, as at 5, and is capable of being entirely raised out of the way and supported by a strut 6 pivotally connected at 7 and adapted to temporarily engage a supporting pin or stud 8 of the side frame. Strut 6 may be retracted by a spring when the table top is lowered, as in Fig. 5. As shown in Fig. 1, top 4 is provided with suitable clearance openings a for the several tool units when the top is lowered, as in usual standard single-unit constructions.

For the purpose of adjustably supporting the several tools in operative and inoperative position, respectively, I provide a plurality of frames 9, 9a, 9b, and 9c, respectively.

Each of said frames is preferably bifurcated or double sided and is provided with terminal bearings 10, 10a, 10b, and 10c, each pair of bearings engaging a common hinge or rock shaft 11 extending across between the opposite side walls of the frame 2, as in Fig. 2. By such construction each of the several frames is thus pivotally mounted on the rock shaft and is capable of individual upward and downward tilting adjustment, with its particular tool unit or units.

At its opposite end each of the frames 9, 9a, 9b, and 9c is provided with a securing screw stud 12 having a tightening and loosening thumb nut 13 and extending through the slot 14 of an arcuate support 15 pivoted at 16 to the under side of frame members 3. By such construction it will be seen that each frame may thus be raised or lowered on its hinge shaft 11 and secured in position for operative or inoperative placement, as desired.

Each of the several tilting frames 9, etc. is provided at its outer middle swinging portion with a driven shaft 17, 17a, 17b, and 17c, respectively. Each such shaft extends through the several tool units, to wit, a rotary planer 18, a band saw pulley 19, a sand papering wheel 20, and a circular saw 21. Shaft 17 is also shown provided with an additional tool unit 22, as a milling tool or the like, for grinding, grooving or rebating.

Tool 22 is removably applied to one end of shaft 17 and clamped thereon by any suitable means, as washers and nut 23.

Each of the several shafts 17, 17a, 17b, and 17c is provided with a spline-engaging clutch 24 of any suitable construction, which co-operates with a companion clutch 25 of a freely mounted driven pulley or sheave 26. The several pulleys 26 impart driven motion to clutch 25 of each tool shaft from a driving belt 27 in driving engagement with a plural groove pulley or sheave 28, freely mounted on the common shaft 11. As shown, the driving belts or cords at one side of the shaft 11 are straightly connected, and those at the other side thereof are crossed for imparting proper direction of motion to the particular tool. It will be understood however that either arrangement of belt may be adopted, depending on the work in view.

The driving pulleys or sheaves 28 are of plural construction and each is geared with a driving belt 29 to a similar driving pulley 30 of main shaft 31. Shaft 31 receives its power, either directly or through intervening gearing $x$, $y$, $z$, from a controlled motor M mounted at any suitable location on the frame, either outside or preferably inside, in the manner generally indicated in Figs. 2 and 9.

Each of the several clutches 24 is thrown into or out of engagement with its companion clutch 25 by means of a hand lever 32 pivoted at 33 on a bracket 34 of the particular frame 9, etc. Levers 32 extend outwardly toward the opposite open end portions of the frame for easy access and manipulation, as shown in Figs. 2 and 4. By such construction and arrangement it will be readily seen that upon rotation of main shaft 31 either of the individual shafts as 17 may be utilized for rotation of its particular tool, the remaining shafts 17a, 17b, and 17c being inoperative. Also that either of said shafts may be similarly selected for use and the others rendered inactive as desired.

Pulley 19, above mentioned as the tool element of frame 9a, is one of a series of pulleys or band saw elements, hereinafter described.

By such construction and arrangement it will be seen that the planer 18 may be elevated to operative position as indicated in dotted lines, Fig. 4, extending through the appropriate registering clearance opening $a$ of top plate 4. Also, that when it and the remaining units are inoperative, the pulley 19 may be raised for loose or non-driving engagement with the band saw, and tightened for operation thereof by lowering frame 9a and securing it in its depending slotted arm 15, as in Fig. 4. Likewise, the sand papering wheel 20 may be similarly raised as in Fig. 3 and there held for operation and then lowered, as may also the circular saw 21.

The band saw 35, as is usual, is of a continuous strip form of proper length and passes around driving pulley 19 of shaft 17a and likewise around similar idle pulleys 36 and 37.

Idler band pulleys 36 and 37 are rotatably mounted on studs 38 extending inwardly from the mounting base portion and terminal of a bracket frame 39. The base portion 40 is of block formation having a flat base 41 adapted to seat on the inwardly extending upper edge portion 50 of the frame 2. Base 40 has downward preferably divided extension 42 in sliding and clamping engagement with a supporting shaft 43 mounted by brackets 44 along the upper outer portion of frame 2.

Extension 42 is provided with tightening screws 45 by which it may be located in operative position as in Fig. 7 or loosened and thrown outwardly and down to inoperative position, as indicated, with the jig saw frame, in dotted lines in Fig. 6.

When erected as in Fig. 4, and the band saw 35 is tightened by lowering pulley 19 by its frame 9a, the band saw is maintained in driving and guiding engagement with its pulleys. When pulley 19 is raised the saw becomes slack and may be removed from pulley 19 and thrown outwardly through slot 46 of the cover plate and clearance 47. The cover may then be raised as in Fig. 5 for such purpose, allowing for removal of the band saw from pulleys 36 and 37.

Similarly mounted for longitudinal and tipping movement on shaft 43, is the jig saw frame 48, as in Fig. 6, resting by its flat base 49 on an inwardly extending shelf 50a of the main frame, around which the plate 4 closely fits, as indicated at 51.

Frame 48 extends laterally by a lug or gudgeon 52 pivotally connected by tightening bolt 53 to a sliding block 54 engaging the shaft 43. Block 54 functions in the same manner generally as extension 42 of the band saw frame 39, and may be tightened thereon by similar bolts or screws. By means of the bolt connection 53 the frame 48 may be swung slightly one way or the other and secured to maintain the jig saw in vertical alinement. Frame 48 arches over across the machine and is provided at its terminal with a housing 55 surrounding a reciprocating stem 56.

Said stem is mounted in extensions 57 of the frame, providing bearings therefor, and for spring 58 engaging a flange 59 of the stem and tending to exert constant reaction upwardly for reverse movement of the saw in its alternating stroke action.

At its lower end stem 56 is provided with a socket 60 engaging a cross pin at the upper end of saw blade 61, for easy and quick insertion and removal. The saw blade 61 extends downwardly through an opening 62 of the cover plate 4 and is similarly connected by cross slot 63 with a stem 64 of the reciprocating pin or bolt 65. The latter is mounted for vertical movement in a housing or casing 66 of a supporting bracket 67 at one side of the pivoted frame member 9c.

Bolt 65 is connected through vertical slot 68 by bolt 69 with a pitman 70, the other end of which is connected by bolt or pin 71 with a crank wheel 72 of shaft 73 mounted in the lower portion of bearing 67. Shaft 73 extends across and is mounted in a similar bearing in the opposite arm of frame 9c and is provided with a grooved pulley 74 connected by a belt 75 with a similar pulley 76 which is fixedly connected with the plural groove pulley 28, so that all three operate together.

It will thus be seen that when pulley 28 is driven, pulleys 76, 74 and 26 will also be driven, and that either may be thrown out of operation or that either singly may be connected, as for operation of the jig saw 61 or circular saw 21 by its particular clutch mechanism. For operating the jig saw, pulley 74 is provided with a clutch 77 freely rotatable on shaft 73, and a clutch 78 in spline engagement with said shaft is provided with a lever 79 pivoted at 80 in the same general manner as lever 32.

As shown in Fig. 3, connected triple groove pulleys 28 and 76 are driven from the main shaft 31 by an individual pulley 30. Jig saw 61 having been connected by its terminals, as in Fig. 6, and adjusted for vertical movement, it will be actuated by shaft 73 and its crank disk 72 so long as clutch engagement 77—78 is maintained. Outer side shaft 43 is provided with adjustable ring abutments 81 and 82, each provided with a set screw or the like, for limiting sliding movement whereby to define the operative position of each of arms 39 and 48 when either of them is to be located in position for its particular work.

Depending from the outer end or head portion of frame 39 is a vertically adjustable spindle 83 adjustably mounted within the head and secured by a set screw 84. At the lower end of spindle 83 is a terminal bearing 85 having a securing set screw 86 for fixed adjustment of a cross pin or shaft 87 provided with a bifurcated terminal guide 88. The band saw 35 is positively guided between the sides of guide member 88 or adjusting screws 89 thereof, maintaining it in fixed relation to the cutting zone of material in passing it over the surface of cover plate 4. By the adjustment of spindles 83 and 87, such guide may be located closely adjacent to the work for maintainance of positive action. By such means both the band saw, and the correct adjustment of the jig saw maintain each of these elements in desirable working relation with their actuating means and the raw material being operated upon.

In Fig. 1 I show a guide member 90 having a vertical face capable of adjustment toward and from the circular saw 21 when elevated through its clearance slot a. Guide 90, which is of conventional construction, is connected by pivoting bolt 91 with terminal 92 of a transverse shaft or spindle 93 which has sliding engagement through a block 94 provided with a securing screw 95.

Block 94 is slidably mounted on a shaft 96 at the other side of the machine similarly mounted in bearings 46, and block 94 is provided with securing set screws 97 by which it may be fixedly held on shaft 96 at any desired position. See Figs. 10 and 11. By longitudinal movement and adjustment of shaft 93 the guide 90 may be located at any desired distance from the cutting zone of the saw 21 to determine the width of the severed piece.

By pivoting connection 91 the face of guide 90 may also be angularly adjusted, as at right angles to the position shown, providing a contact face for the work at any other desired location. Thus for cross cutting the piece may be moved towards in cross cutting the piece may be moved towards the circular saw against the guide member, while the guide and its supporting arm are shifted along the shaft 96.

I show also in Fig. 10 a similar construction and mounting in which the spindle 93 is provided at its inner terminal with a guide 98, pivotally connected by securing screw 96 so as to adjust it to any desired degree of inclination. By such means it is capable of being set to any desired angle to form a bearing for a blank A so as to effect a bevel planed edge, as by passing it over the planer 19. Guide 98 is capable of a considerable degree of additional adjustment, both longitudinally and laterally of the machine, and may be utilized in connection with any one of the various tool units, as will be readily understood.

Under some conditions it is desirable to slightly elevate the hinged cover plate 4, as in jig and band saw cutting. For such purpose I provide a pair of lifting arms 100 extending from a cross shaft 101, suitably supported in opposite bearings and having a downwardly extending actuating lever 102. The latter is connected by a compensating slot joint or otherwise 103 with an adjusting nut 104 of threaded shaft 105.

Said shaft extends outwardly through bearing 106 of the main frame and is provided with a turning crank 107. By such means it is possible to elevate the table 4 as indicated in dotted lines to a limited degree and to lower it to its normal flat position, as desired.

The construction and operation of the machine will be readily understood from the foregoing description. It comprises in its entirety a number of tool units in very compact arrangement and within a comparatively limited compass of construction.

Each individual cutting, shaping, or finishing tool is capable of individual operation by and through the mounting, adjusting and driving mechanism illustrated and as above described. All of the several parts are readily available and easily inspected. Each particular unit may be easily removed or replaced without involving any extensive taking apart of the machine, and the several adjustments adapt it to a wide and variable application of work of the different kinds ordinarily provided for in a single machine.

By reason of the clutch mechanism and the raising and lowering means, every particular unit not desired for use at any particular time may be disconnected and lowered out of operative position. The machine is therefore rendered entirely safe to the operator and the avoidance of any liklihood of accident following the use of ordinary care and discretion in its use. It is comparatively simple in construction, economical of manufacture, capable of installation in a limited space and of economical use of power.

It will be understood that while as presented the invention involves the use of a certain number of tool units, others may be substituted wherever they are capable of being embodied and are adapted to the individual driving and adjusting means disclosed. Also that changes or variations may be made in the construction, arrangement of parts, details, etc. by the skilled mechanic or others, but that all such changes are to be understood as intended and within the scope of the following claims.

What I claim is:

1. In combination with a frame provided with a hinged top plate having a clearance opening, a transverse hinge shaft, a frame hinged thereon provided with a rotatable tool shaft, driving means on the hinge shaft geared with a freely running gear on the tool shaft, a co-acting clutch therefor engaging the tool shaft, means for locating the frame at varying vertical positions, a rock shaft having lifting arms beneath the top plate and a lever connected with a nut, and a threaded shaft engaging the nut provided with a crank.

2. In combination with a frame provided with a top plate having a clearance opening, a transverse hinge shaft, a U-shaped frame having divided bearings hinged thereon provided at its outer swinging portion with a rotatable tool registering with the clearance opening, a driving shaft therefor journalled in bearings at each side of the frame having a freely mounted gear, driving means journaled on the hinge shaft geared therewith, a clutch for connecting the freely mounted gear with the driving shaft, a clutch lever therefor on the hinged frame, and means for adjusting the frame vertically.

3. A wood working machine having a hinge shaft and a U-shaped tool-supporting frame having bifurcated bearings hinged thereon and provided with a shaft having a rotatable tool, depending means pivoted to the machine adapted to be connected with the outer vertically swinging end of the frame for variably locating it and the tool in operative and inoperative positions respectively, power imparting means journalled on the hinge shaft between the bifurcated bearings in driving connection with the tool, and an intervening clutch.

4. A wood working machine having a hinge shaft and a U-shaped tool-supporting frame having bifurcated bearings hinged thereon and provided with a shaft having a rotatable tool, a pivotally supported depending slotted guide arm for the outer end of the frame and a co-operating holding stud and thumb nut element on the frame, power imparting means on the hinge shaft between the bifurcated bearings in driving connection with the tool shaft, and an intervening clutch.

5. In a wood working machine having a working face apertured top and a hinge shaft, a tool-supporting frame hinged to said shaft having shaft bearings, a tool shaft journalled in said bearings having a tool and a freely rotatable gear member and clutch, a power imparting element on the hinge shaft geared with said member, a co-operating clutch operatively engaging the tool shaft, a lever therefor mounted on the outer end of the frame, and means for variably locating the frame and tool in operative and inoperative positions respectively consisting of a slotted arm hinged to the machine and a stud on the outer end of the tool-supporting frame extending through the slotted arm and provided with a tightening nut.

6. In a woodworking machine, in combination with a main supporting frame and an apertured work surface top, a transverse hinge shaft, a plurality of individually adjustable frames hinged on the transverse shaft each provided with a tool shaft journalled in its outer portion and having a loosely mounted gear element and a shaft connecting clutch, a clutch lever pivotally mounted on the hinge frame, power-imparting elements on the hinge shaft geared with the loosely mounted gear elements of the tool shafts, and a pivoted support having sliding engagement with the outer end of the hinged frame and means for connection therewith.

7. In a woodworking machine, in combination with a main supporting frame and an apertured work surface top, a transverse hinge shaft, a plurality of individually adjustable frames hinged on the transverse shaft each provided with a tool shaft journalled in its outer portion and having a loosely mounted gear element and a shaft connecting clutch, a clutch lever pivotally mounted on the hinged frame, power-imparting elements on the hinge shaft geared with the loosely mounted gear elements of the tool shafts, a main drive shaft having individual driving connection with the several power-imparting elements on the hinge shaft, and a depending pivoted support having sliding engagement with the outer end of the hinged frame and means for connection therewith.

JOSEPH A. HIRTZ, Sr.